United States Patent [19]

Quon

[11] Patent Number: 4,546,042
[45] Date of Patent: Oct. 8, 1985

[54] PRODUCT HAVING COMBINED PHOSPHORESCENT-REFLECTIVE APPEARANCE AND METHOD

[75] Inventor: Joe S. Quon, Sunnyside, N.Y.

[73] Assignee: Multi-Tex Products Corp., Kearny, N.J.

[21] Appl. No.: 574,487

[22] Filed: Jan. 27, 1984

Related U.S. Application Data

[63] Continuation-in-part of Ser. No. 538,870, Oct. 4, 1983.

[51] Int. Cl.[4] .............................................. D02G 3/00
[52] U.S. Cl. .................................. 428/378; 428/384; 428/389; 428/392; 428/394; 428/401; 156/67; 156/271
[58] Field of Search ................ 428/207, 690, 215, 251, 428/263, 283, 325, 334, 378, 482, 691, 384, 389, 392, 394, 401; 427/157, 7; 156/67, 271

[56] References Cited

U.S. PATENT DOCUMENTS

| | | | |
|---|---|---|---|
| 3,001,311 | 9/1961 | Holsapple | 156/67 |
| 3,291,668 | 9/1962 | Goldstein | 428/690 |
| 3,608,298 | 3/1969 | Schoots et al. | 156/271 |
| 3,802,944 | 4/1974 | Tung | 428/143 |
| 4,211,813 | 7/1980 | Gravisse et al. | 428/913 |
| 4,336,092 | 6/1982 | Wasserman | 156/269 |

FOREIGN PATENT DOCUMENTS 82110 7/1976 Japan ..................................... 156/67

Primary Examiner—George F. Lesmes
Assistant Examiner—William M. Atkinson
Attorney, Agent, or Firm—David A. Jackson; Daniel H. Bobis

[57] ABSTRACT

A decorative composite article which may be longitudinally slit to form a yarn product is disclosed which has a combined a phosphorescent and retroreflective decorative appearance. The composite article includes a phosphorescent film component prepared from a thermoplastic resin base having a phosphorescent colorant disposed on the outer directed surface. The phosphorescent film component is laminated to a retroreflective film component comprising a thermoplastic resin base containing a quantity of reflective glass beads or lenses bonded thereto. The retroreflective film component bears a layer of an adhesive composition on its free surface, which is oriented during lamination to enter adhesive engagement with the uncoated surface of the phosphorescent film component.

The composite article prepared in accordance with the present invention offers improved flexural strength in combination with a unique decorative appearance that combines the benefits of phosphorescent activity with direct reflective capability. The composite article may be slit longitudinally to a variety of widths to form a yarn product useful in a variety of decorative applications.

14 Claims, 2 Drawing Figures

PRODUCT HAVING COMBINED PHOSPHORESCENT-REFLECTIVE APPEARANCE AND METHOD

CROSS REFERENCE TO RELATED APPLICATION

The present application is a Continuation-In-Part of Ser. No. 538,870, filed Oct. 4, 1983 by the inventor herein.

BACKGROUND OF THE INVENTION

1. Field of the Invention

The present invention relates to composite laminates useful for decorative applications, and particularly to composites offering novel reflective effects that may be formed into synthetic sheet and yarn products.

2. Description of the Prior Art

Numerous products are known that offer various attractive, decorative effects when embodied in sheet and yarn form. In particular, composite yarn products are conventionally prepared in shapes ranging from ribbon strips to light-conductive fibers. Examples of such products are disclosed in U.S. Pat. No. 2,166,819 to Miller which prepares a two-ply ribbon strip by the adhesive bonding of two layers of plastic to each other, followed by the longitudinal slitting of the composite product. Similarly, U.S. Pat. No. 3,361,616 to Scharf discloses the preparation of a composite yarn by the disposition of strands of thread or strands of metalized material between two resinous sheets. U.S. Pat. No. 3,666,587 to Nagao discloses the preparation of a light-conducting fiber by the preparation of a sandwich of a polystyrene material between acrylic sheet materials. Finally, U.S. Pat. No. 4,336,092 to Wasserman, discloses the preparation of a retroreflective fiber by the lamination of a supporting polyester film base to an elastomer film having retroreflective beads bonded thereto, and thereafter slitting the resulting laminate.

The reflective products presently available, particularly those products formed into yarn materials suffer from certain disadvantages, as outlined in the Wasserman patent discussed above. Thus, attempts to bond various reflective materials to resinous films are frequently unsuccessful, as the reflective material tends to delaminate or otherwise detach from the film when it is formed into a yarn product, due to the shear forces typically imposed upon the yarn during its formation and later use. The nature of the reflective materials as they are incorporated in the Wasserman product was found by the present inventor to offer further disadvantages in that the integrity of the resulting laminate product was short-lived. Thus, the particulate materials within the resin films tended to rupture the film notwithstanding the reenforcement offered by the polyester film, when yarn products were formed and spun. As a result, composite reflective yarn materials prepared with the Wasserman product were commercially unsuitable. Even in the instance where the reflective materials were in finely divided particulate form, delamination and other unacceptable surface discontinuities developed.

In my co-pending application Ser. No. 538,870, for "Product With Combined Fluorescent-Phosphorescent Appearance and Method" the disclosure of which is incorporated herein by reference and thus made a part hereof, a decorative composite article was proposed which exhibited a combination of phosphorescent and fluorescent visual characteristics by the application of a coating composition including a combined colorant component having both the phosphorescent and fluorescent colorants disposed therein. This particular composition offered the advantages of a unique combination of visual effects that were both independently light-emittiog as well as light reflective. It was found that the properties of this product were particularly useful in decorative applications, such as when a composite laminate was prepared as a yarn product, as both of the visual properties offered in combination a distinctive appearance that defied characterization as either phosphorescent or fluorescent in origin. The coating composition and the products prepared therewith have been found to be particularly well suited for a variety of decorative and security uses where the combined visual appearance is desirable.

Notwithstanding the above, the garment trade in particular, has long sought a material offering the reflectivity of the beaded products as exemplified by the Wasserman Patent, with a visual appearance of greater depth and distinctive character and corresponding attractiveness. As this need is believed to exist, the present invention has been developed in an effort to be responsive thereto.

SUMMARY OF THE INVENTION

In accordance with the present invention, a decorative composite article is prepared which comprises a first phosphorescent film component comprising a thermoplastic resin base with a decorative coating composition applied thereto, and a second retroreflective film component adhesively bound to the first phosphorescent film component, the second retroreflective film component comprising a thermoplastic resin base having a plurality of minute exposed glass beads or lenses bonded thereto. The retroreflective film component bears an adhesive coating on one of its broad surfaces, which is positioned adjacent the uncoated surface of the first phosphorescent film component during lamination of the film components to each other. The resulting composite article is a two-sided decorative composite film product having on one outer surface thereof the phosphorescent coating composition, and on the opposite outer surface, the retroreflective bead-containing outer film surface.

Preferably, the phosphorescent film component is prepared with a thermoplastic resin base having a thickness of up to about 1 mil, with a layer of the decorative phosphorescent composition applied thereto to a thickness of about 2 mils. The retroreflective film component may range in thickness of up to about 5 mils, including the thermoplastic resin base with the reflective beads disposed on one broad surface thereof, and the adhesive composition disposed on the opposite broad surface. Accordingly, the final composite laminate may have a total thickness that may range from 7 to 10 mils.

The decorative phosphorescent coating composition comprises a phosphorescent colorant and a resin binder material in which the colorant is disposed. The colorant component may be present in an amount by weight of up to about 50% of the total weight of the coating composition, with the resin binder and suitable additives making up the remainder.

The phosphorescent colorant may comprise particulate materials having particle sizes preferably on the order of up to about 15 microns. The phosphorescent colorant may comprise an inorganic pigment based upon simple and complex metal sulfides such as zinc sulfide.

The resin binder for the phosphorescent coating composition may be selected from a variety of thermoplastic resins including polyesters such as polyethylene terephthalate, acrylic polymers and copolymers, such as acrylonitrile, certain elastomeric materials such as acrylonitrile-butadiene rubbers, polyurethanes and mixtures thereof. A particular resin binder comprises a mixture of a polyurethane and an acrylonitrile-butadiene rubber.

The present invention also relates to a method for the preparation of the decorative composite laminate, comprising preparing the individual film components, and thereafter bonding the film components to each other by passing the same through pressure rollers, with the surface of the retroreflective component bearing the adhesive coating positioned in the direction of the phosphorescent film component, so that the two film components are thoroughly bonded as they pass through the nip of the rollers. The retroreflective film component may utilize a variety of adhesives, including adhesives responsive to heat and/or pressure. In a preferred embodiment, the respective film components are laminated to each other with the application of heat and pressure.

The laminate construction may vary, and accordingly a multi-ply product is contemplated. For example, the phosphorescent film component may be prepared and laminated to itself in accordance with the teachings of my copending application Ser. No. 538,870, already incorporated herein by reference. Thereafter, the resulting laminate may be bonded as disclosed earlier to the retroreflective film component.

In a further embodiment of the present invention a yarn product may be prepared which comprises strands of the decorative composite article slit to various widths depending upon end utilities. Thus, the yarn products prepared with the composite laminate of the present invention offer a unique, two-sided variation in visual appearance, due to the opposite disposition of the phosphorescent surface and the retroreflective surface.

In the instance where the present laminate is prepared and is wound about a variant yarn, such as disclosed in the Wasserman Patent, referred to hereinabove, a variegated appearance is achieved that is particularly pleasing. Such yarn products find broad appeal and demand in garment manufacture, where they may be used for fabric as well as trim applications.

Accordingly, it is a principal object of the present invention to provide an improved decorative article offering a combination of broad light reflective properties and durability.

It is a further object of the present invention to provide a decorative article as aforesaid which may be prepared simply and inexpensively.

It is a still further object of the present invention to provide a decorative article that exhibits both phosphorescent and retroreflective properties.

It is a still further object of the present invention to prepare a decorative article capable of further processing to form a durable and attractive yarn product.

Other objects and advantages will become apparent to those skilled in the art from a review of the ensuing description which proceeds with reference to the following illustrative drawings.

DETAILED DESCRIPTION

In accordance with the present invention, decorative composite articles such as yarn products may be prepared having a combined phosphorescent and retroreflective decorative capability from a phosphorescent film component comprising a thermoplastic resin base to one surface of which has been applied a layer of a phosphorescent composition, the composition in turn comprising a phosphorescent colorant disposed in an organic resin binder material, wherein the phosphorescent colorant is present in an amount of up to about 50% by weight of the total coating composition, with the resin binder and suitable additives such as solvents, and the like, comprising the remainder. A representative composite structure is illustrated in FIG. 1.

Figure 1:
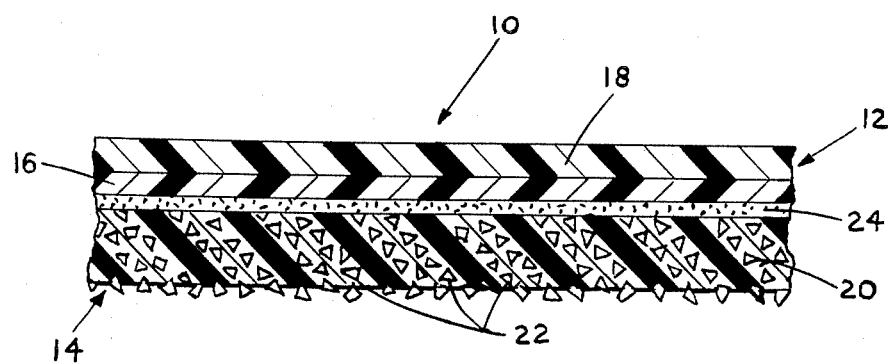
FIG. 1 is a sectional view illustrating a laminate in accordance with the invention.

Referring now to FIG. 1, decorative composite article 10 includes a retroreflective film component 14 bound to the phosphorescent film component 12. As mentioned, phosphorescent film component 12 comprises thermoplastic resin base 16 coated with phosphorescent composition layer 18. Retroreflective film component 14 comprises an elastomeric resin base 20 with a plurality of glass beads 22 bonded therewithin as well as on the surface. Also, retroreflective film component 14 has on the broad surface to which beads 22 are not bonded a layer 24 of an adhesive coating to facilitate application or attachment of film component 14 to a base or substrate.

Thermoplastic resins suitable for use as the base or substrate of the phosphorescent film component may be selected from known materials such as polyesters, including polyethylene terephthalate, polyolefins such as polypropylene and polystyrene, vinyl polymers such as polyvinyl chloride, polycarbonates such as ABS resins, and others. Preferably, polyester films, and in particular such films having thicknesses ranging from about 0.25 to about 1.0 mil may be used. A suitable resin is well known under the trademark "MYLAR ®" which is manufactured by E. I. Dupont De Nemours and Co., Wilmington, Del. A particular thickness useful in accordance with the present invention is 0.48 mil.

The decorative phosphorescent composition applied to the resin base comprises a phosphorescent colorant disposed in an organic resin binder. Suitable phosphorescent colorants include well known phosphorescent pigments such as those based on zinc sulfide, cadium sulfide or complex sulfides including both metals. In the instance where inorganic phosphorescent pigments are prepared, they should preferably be utilized with particle sizes ranging up to about a size capable of passing through a 100 mesh screen, with approximate particle sizes ranging from about 4 to 10 microns. A particular phosphorescent pigment is identified as "EXCITE 2330" manufactured by U.S.R. Optonix, Incorporated of Hackettstown, N.J. This colorant is an inorganic phosphorescent powder based upon zinc sulfide. "EXCITE 2330" has a pale green daylight color and responds to excitation by daylight, incandescent light, fluorescent light or ultraviolet light and retains an afterglow for up to about ten hours after the removal of exposure to any of the aforenoted light sources. Naturally, this pigment is exemplary of phosphorescent pigments useful in accordance with the present invention, it being understood that other phosphorescent pigments, dyes and the like would be similarly useful.

The phosphorescent colorant component is prepared with a resin binder in an amount whereby the colorant may range up to 50% by weight of the total composition. Suitable resin binders include polyesters such as polyethylene terephthalate, polyurethanes and acrylic polymers and copolymers, such as homopolymers and copolymers of acrylonitrile, and mixtures of these. Other elastomeric materials generally known as nitrile rubbers, may also be used herein. A particular resin binder is a copolymer of butadiene and acrylonitrile manufactured by Clifton Adhesive, Inc. of Wayne, N.J. and identified by the product number LA 2524-3. It has a viscosity of 600 CPS, a flash point of 35° F. and a solids content of 21.3% ±0.2. It is clear in color and is soluble in methylethyl ketone (MEK).

Suitable polyurethane resins include resins formed by the reaction of a polyol with an isocyanate compound as aliphatic and aromatic isocyanates. The polyurethane may include in its formulation an effective amount of a catalyst such as benzoyl peroxide, substituted and unsubstituted azobisbutyronitrile, and metal catalysts such as sodium, lithium, and organo metallic catalysts (i.e. Ziegler-type catalysts). The above list of resins and catalysts is representative only, as the invention contemplates a variety of such resins within its scope.

The adhesive or resin binder may comprise mixtures of the aforenoted materials, and, for example, may include a mixture of a polyurethane and an acrylonitrile or polyester resin. The exact proportions of each material in the final composition may vary within the broad limits expressed earlier for the presence of the resin binder in the present composition.

The composition may also contain secondary ingredients such as solvents and where appropriate, fillers, extenders and the like. Suitable solvents include the lower alkanols, and their corresponding alkyl acetates, as well as alkyl ketones. A particular solvent that is used, is methylethyl ketone (MEK), which may be present in an amount effective to form a final composition having a viscosity of about 23 seconds as measured with a No. 3 Zahn Cup. The solvent may, for example, be present in an amount of up to about 20% by volume of the final composition.

The composition of the present invention may be prepared by the mixture of the phosphorescent colorant and the adhesive or resin binder in any order with respect to each other. The mixture or dispersion should be maintained under agitation, however the degree of agitation is not critical. After all of the ingredients have been admixed, the resulting composition should be adjusted in viscosity to approximately 23 seconds as measured with a No. 3 Zahn Cup. In the event that the viscosity of the composition is higher than the aforementioned value, additional methylethyl ketone may be added with continual agitation and monitoring.

After the composition is prepared, it may be maintained in a container and stored for later use, or for immediate application to an appropriate resin base. In the event that the coating composition is to be immediately applied to the resin base, it should be maintained in a dispenser under agitation, and preferably with an agitator having a speed of rotation of about 200 RPM. In particular, a flat bottom stainless steel dispenser should be utilized with a rotating agitator having blades with flat edges corresponding to the flat bottom of the dispenser, to maintain the phosphorescent pigment in suspension.

The application of the coating composition to the substrate may be conducted by a roller coating procedure which, however, follows certain specific guidelines. In particular, the dispenser containing the coating composition is preferably positioned to prevent the composition from developing excessive velocity on pouring toward the rollers, so that the phosphorescent pigment does not unduly disperse. For example, in the instance where 10 inch rollers are utilized, the mixture is fed to the rollers at the rate of 19 feet per minute or 1.1 pints of mixture per minute. The roller speed generally exceeds 19 feet per minute and may preferably be 19.1 feet per minute. The mixture is fed on to the rollers and a coating of approximately 2 mil thickness is applied.

After the application of the coating, the final phosphorescent film component comprising the coated resin base passes a drying station, where it is exposed to a drying temperature which may range up to about 280° F. The resin base may be a continuous film which moves past the drying station at a speed of about 20 feet per minute so that respective portions of the film have a dwell time in this step of about 3 seconds.

The retroreflective film component is preferably prepared as a thin film containing a plurality of glass beads or lenses in its matrix and on one broad surface, and a coating of an adhesive composition on the opposite broad surface. An exemplary film is manufactured by the 3M Company of Minneapolis, Minn. and is commercially identified as No. 8710 Scotchlite ® brand transfer film. The retroreflective film preferably has a thickness of about 0.5 mil and may bear either a pressure-sensitive or heat-sensitive adhesive. Preferably, the thermoplastic resin base of the retroreflective film is an elastomer, and may be selected from polyolefins, polyurethanes, vinyl polymers and copplymers, and mixtures. Thus, the resin base may be a synthetic rubber elastomer such as SBR rubber or the like, with variations in the particular elastomer chosen residing within the scope of this invention.

The final article bearing the combined phosphorescent and retroflective properties comprises a multi-layered article prepared by the lamination of two indefinite lengths of the respective film components which are bonded to each other with their decorative surfaces opposed. Thus, an indefinite length of the phosphorescent film component may be brought together with a similar length of the retroreflective film component, with the respective film components oriented so that the adhesive coating dispersed on the retroreflective film component will reside against the uncoated surface of the phosphorescent film component. In this orientation, the respective film components are passed between the nip of pressure rollers to form a composite having broad outer surfaces comprising on one side a phosphorescent coating and on the opposite side, the exposed retroreflective beads. The final article may have a total thickness of up to about 8 mil, comprising a 5 mil thickness of the retroreflective film and a thickness of from about 2.5 to about 3.0 mil for the phosphorescent film component. The lamination of the respective coated films to each other may take place, for example, at a temperature of 325° F., and a pressure of about 700 PSI. The resulting laminate may exit the nip of the pressure rollers and may be placed on a wind up roller. The nature of the coating composition is such that the laminate will be self-curing at room temperature.

In an alternate embodiment of the invention, the phosphorescent film component may itself be prepared as a sandwich-type laminate prior to its affixation to the retroreflective film component. This procedure is similar to that disclosed in my copending parent application, wherein individual indefinite lengths of the phosphorescent film component may be joined to each other by passing through the nip of heated pressure rollers. In such instance the films are oriented with their coated surfaces juxtaposed to each other, so that the composite component has two thermoplastic base members with an interstitial layer comprising a double thickness of the phosphorescent coating composition. The thickness of this combined film component may be from 5 to 6 mils, with the thermoplastic resin bases accounting for about 1 mil, and the interstitial coating approximately 4 mil in thickness. Naturally, the exact thickness values may vary within the scope of the invention.

The lamination of the phosphorescent film components to each other may take place, for example, under a pressure of 400 PSI and at a temperature of 325° F. The foregoing conditions are disclosed for purposes of illustration only and in fulfillment of the duty to disclose a best mode for the practice of the invention.

Figure 2:
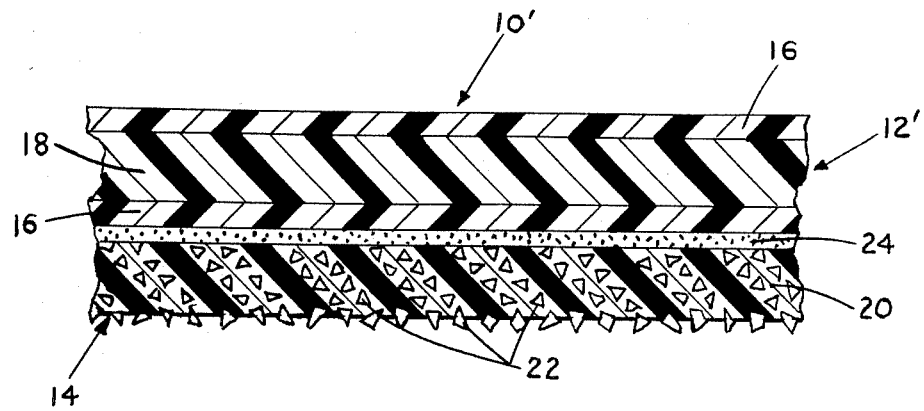
FIG. 2 is a sectional view illustrating a laminate in accordance with an alternate embodiment of the invention.

Referring now to FIG. 2, the composite laminate 10' is illustrated, and is seen to comprise a combined phosphorescent film component 12' consisting of base films 16 disposed adjacent each other with their respective layers 18 (shown as a single layer) of phosphorescent coating composition juxtaposed to each other. One of the uncoated surfaces of the films 16 has been laminated to the retroreflective film component 14 with the adhesive layer 24 disposed between the two as shown. In this instance, the product would undergo two sequential laminations, wherein the juxtaposed phosphorescent film components would first be laminated to each other, and thereafter the resulting laminate would be bound to the retroreflective film component in accordance with the conditions disclosed earlier herein.

As mentioned herein, the present invention also includes a yarn product, comprising the composite article of the present invention prepared to a variety of yarn widths by a slitting operation. The composite article may thus be withdrawn from the wind up reel a suitable time period after lamination has taken place, such as 48 hours, and may thereafter be longitudinally slit to a variety of widths in accordance with procedures and utilizing apparatus known in the art. Thus, a variety of procedures and apparatus such as disclosed in U.S. Pat. Nos. 3,528,877; 3,666,587 and 4,336,092 may all be employed to slit the laminated article of the present invention into a variety of yarns for various commercial applications. The disclosures of the aforenoted patents are accordingly incorporated herein by reference insofar as they disclose slitting techniques and apparatus useful in accordance with the present invention.

One of the aspects of the present invention is the unique reflective effect achieved by the combined phosphorescent and retroreflective film components of the present decorative article. The combined components overlap in their properties, so that, for example, the phosphorescent colorant exhibits certain reflective properties which favorably coact with those of the retroreflective component to offer an improved richness and brilliance of reflectivity in use. Also, when a light source is removed, the phosphorescent component continues to offer a visually pleasing glow for an extended period of time. The combination of these properties results in the subtle change in visual appearance of the coated products as lighting conditions change, which adds further attractiveness and aesthetic appeal, particularly when the articles of the present invention are prepared as yarn products which are woven into garments or other materials having complementary coloration. Thus, the warmth, brilliance or other positive qualities of a given color scheme can be accentuated and thereby improved by the incorporation of a quantity of yarn prepared in accordance with the present invention.

The present invention will be better understood from a consideration of the following illustrative examples, wherein all percentages expressed are to be considered as percent by weight unless otherwise defined.

EXAMPLE I

A phosphorescent coating component was prepared, with a phosphorescent pigment known as "EXCITE 2330" manufactured by U.S.R. Optonix, Incorporated. The phosphorescent pigment had a particle size ranging up to about 10 microns and comprises an inorganic phosphorescent powder based upon zinc sulfide.

Twleve pounds of the phosphorescent pigment mentioned above was dispersed in a quantity of methylethyl ketone, after which a combined resin binder prepared from 13 pounds of a polyurethane prepared from a polyol and an aromatic isocyanate, and having a viscosity of 30 seconds measured with the No. 3 Zahn Cup, and seven pounds of a copolymer of butadiene and acrylonitrile, having a 21.2% solids and identified as LA 2524-2, manufactured by Clifton Adhesive, Incorporated were added. The foregoing ingredients were mixed with agitation and maintained thereunder while being stored for use. The coating composition was placed in a steel dispenser and was agitated with a rotary bladed mixer at a speed of 200 RPM.

EXAMPLE II

A resin base was prepared in a continuous film of Mylar ® having a thickness of about 48 gauge (0.48 mil). This continuous film was prepared in a 10 inch width and was directed past a roller coating station, with rollers having a 10 inch length. The rollers were fed a quantity of the composition prepared in EXAMPLE I, at a rate of about 19 feet per minute. The roller speed exceeded the rate of composition speed by approximately 0.1 foot per minute and the composition was applied to the coating rollers along an indirect, cascading line of travel. The composition was applied to a thickness of about 2 mil on a continuous basis, and the thus coated resin base film was passed through a drying station, where the film was exposed to a temperature of about 280° F. for a period of about 3 seconds dwell time. The rate of travel of the coated film at this point was approximately 20 feet per minute.

EXAMPLE III

The composite article of FIG. I was prepared by the lamination of the phosphorescent film prepared in Example II to a retroreflective film having an identical width and a 5 mil thickness, and comprising No. 8710 Scotchlite ® brand transfer film manufactured by the 3M Company, Minneapolis, Minn. The films were oriented with the adhesive surface of the retroreflective film positioned to lay against the uncoated surface of the phosphorescent film base. The two films were passed through the nip of pressure rollers of which one roller was steel and the other rubber. Laminating pressure was about 700 PSI and temperature was about 325° F. The resulting laminate was withdrawn to a take-up reel and stored for later use.

EXAMPLE IV

In this Example, the composite article of FIG. 2 was prepared by the inital lamination of two identical coated films which had been prepared in accordance with the procedure outlined in EXAMPLE II above. The films were directed toward the nip of pressure rollers, with the coated surfaces juxtaposed to each other. The films passed through the pressure roller stand, of which one roller was steel and the other rubber surfaced. The roller assembly or stand was heated, so that the lamination took place at a temperature of about 180° F. and a pressure on the order of about 400 PSI.

The resulting laminate exited the pressure rollers and was then directed to a second roller stand, where it was joined with the retroreflective film drawn from a pay-out reel. This second lamination was conducted under the same conditions set forth in Example III, above, and the resulting composite laminate was likewise withdrawn to a take-up reel for storage or further use.

In the instance where a yarn product is to be prepared, the take-up reel bearing either of the above-prepared products may be directed through an appropriate slitting apparatus, comprising parallel knives or other comparable apparatus as disclosed in the aforementioned U.S. Patents earlier incorporated herein by reference, whereupon a plurality of composite yarn strands or ribbons are formed, which may then be taken up on individual bobbins, where they would be available for later use, such as in the weaving of reflective fabrics for decorative purposes, and other desired applications.

The composite structure of the present articles renders them eminently well suited for weaving or other fabric forming operations, as they are able to withstand the shear forces that are imposed upon thread during such processing, without exhibiting delamination or other undesirable deterioration. The broad range of reflective properties imparted to the present articles by the combination of the phosphorescent and retrorespective components in the manner disclosed herein, contributes to a product having improved depth and brilliance of color, and unique reflectivity that finds no parallel in other commercially available products of this general type. The ease and economy of manufacture are likewise advantages of the present invention that enhance its commercial value.

This invention may be embodied in other forms or carried out in other ways without departing from the spirit or essential characteristics thereof. The present disclosure is therefore to be considered as in all respects illustrative and not restrictive, the scope of the invention being indicated by the appended Claims, and all changes which come within the meaning and range of equivalency are intended to be embraced therein.

What is claimed is:

1. A decorative composite laminated yarn product comprising one or more filaments formed from a composite laminate, said composite laminate comprising:
A. a phosphorescent film component, said phosphorescent film component comprising a thermoplastic resin base and a layer of a decorative phosphorescent composition applied thereto, said phosphorescent composition comprising a phosphorescent colorant disposed in an organic resin binder in an amount of up to about 50% by weight of said phosphorescent composition; and
B. a retroreflective film component bound to said phosphorescent film component, said retroreflective film component comprising a thermoplastic resin base having a plurality of glass beads bound to one broad surface and a layer of an adhesive coating on the other broad surface thereof;
C. said phosphorescent film component laminated to said retroreflective film component with said phosphorescent composition and said exposed beads disposed on their respective opposed outer surfaces, and said adhesive coating disposed therebetween.

2. The laminated yarn product of claim 1 wherein:
A. said thermoplastic resin bases have a thickness of up to about 1 mil;
B. said decorative phosphorescent coating composition is present in a layer having a thickness of up to about 2 mil; and
C. said retroreflective film component has a thickness of about 5 mil.

3. The laminated yarn product of claim 1 wherein said phosphorescent colorant comprises an inorganic pigment in particulate form, said inorganic pigment based on zinc sulfide.

4. The decorative composite article of claim 1 wherein said phosphorescent film component comprises paired thermoplastic resin bases, each base having a thickness of up to about 1 mil, and said decorative phosphorescent coating composition disposed between said bases, said layer having a thickness of up to about 4 mil.

5. The laminated yarn product of claim 1 wherein the thermoplastic resin bases of said phosphorescent film component are prepared from a film of a thermoplastic resin selected from the group consisting of polyesters, polyolefins, vinyl polymers and copolymers, and polycarbonates.

6. The laminated yarn product of claim 5 wherein said thermoplastic resin bases are prepared from a polyester film.

7. The laminated yarn product of claim 1 wherein the thermoplastic resin base of said retroreflective film component comprises an elastomer.

8. The laminated yarn product of claim 3 wherein said elastomer is selected from the group consisting of polyolefins, polyurethanes, vinyl polymers and copolymers, and mixtures thereof.

9. The laminated yarn product of claim 1 wherein said organic resin binder is selected from the group consisting of polyester resins, polyurethane resins, acrylic polymers and copolymers, polyolefins, elastomers, and mixtures thereof.

10. The laminated yarn product of claim 9 wherein said polyester resins comprise polyethylene terephthalate, said polyurethane resins are prepared from the reaction of an aromatic isocyanate and a polyol, said acrylic polymers comprise acrylonitrile, and said acrylic copolymers comprise a butadiene-acrylonitrile rubber.

11. The laminated yarn product of claim 10 wherein said organic resin binder comprises a mixture of said polyurethane resin and said butadiene-acrylonitrile rubber.

12. A method for preparing a decorative laminated filaments offering a combined phosphorescent and retroreflective decorative appearance, comprising:

A. providing a length of a thermoplastic resinous film having a thickness of up to about 1 mil;
B. coating the thermoplastic resinous film with a phosphorescent coating composition comprising
   i. a phosphorescent colorant component, and
   ii. a resin binder material,
   iii. said colorant component present in an amount by weight of up to 50% of the total weight of said composition,
   iv. said resin binder material selected from the group consisting of polyester resins, polyurethane resins, acrylic polymers and copolymers, polyolefins, elastomers, and mixtures thereof;
C. drying the film coated in accordance with Step B above;
D. preparing a second indefinite length of a retroreflective film comprising a thermoplastic resin base having bonded to it a plurality of glass beads on one broad surface and a layer of an adhesive coating disposed on the opposite broad surface thereof;
E. laminating the coating film prepared in Steps A–C above to the retroreflective film with said phosphorescent composition and the surface bearing exposed of said beads disposed to be on the outer surfaces of said composite, and with said adhesive coating disposed between the two, by passing the films in this orientation together through heated pressure rollers; and
F. longitudinally slitting the composite laminate product prepared in Step E to form a plurality said filaments.

13. The method of claim 12 wherein said films are bonded to each other at a pressure of about 700 PSI and a temperature of about 325° F.

14. The method of claim 12 wherein after Step C, the coated film prepared thereby is laminated to a quantity of like film, and the resulting composite laminated film thereafter participates with said retroreflective film of Step E.

* * * * *